United States Patent
Sedberry et al.

(10) Patent No.: US 9,937,454 B2
(45) Date of Patent: Apr. 10, 2018

(54) MOBILE MULTI SACK DUST COLLECTION APPARATUS

(71) Applicant: Halliburton Energy Services, Inc., Houston, TX (US)

(72) Inventors: Winfred T. Sedberry, Edmond, OK (US); Wesley Warren, Marlow, OK (US); Nitinkumar Pandurang Katke, Maharashtra (IN); Vishwajit Manajirao Ghatge, Maharashtra (IN); Rajesh Sanda, Maharashtra (IN); Atul Bhupal Bokane, Maharashtra (IN); Alexander Marks, Duncan, OK (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 59 days.

(21) Appl. No.: 15/022,106

(22) PCT Filed: Nov. 11, 2013

(86) PCT No.: PCT/US2013/069422
§ 371 (c)(1),
(2) Date: Mar. 15, 2016

(87) PCT Pub. No.: WO2015/069292
PCT Pub. Date: May 14, 2015

(65) Prior Publication Data
US 2016/0220937 A1 Aug. 4, 2016

(51) Int. Cl.
*E21B 21/07* (2006.01)
*B65G 29/02* (2006.01)
(Continued)

(52) U.S. Cl.
CPC ............ *B01D 46/02* (2013.01); *B01D 46/002* (2013.01); *E21B 21/07* (2013.01); *E21B 41/00* (2013.01)

(58) Field of Classification Search
CPC .......... E21B 21/07; B65G 29/02; B01D 50/00
(Continued)

(56) References Cited

U.S. PATENT DOCUMENTS

| 2,182,854 A | 7/1937 | Pfeffer et al. |
| 2,596,670 A * | 5/1952 | Francis .............. B23Q 11/0046 175/206 |

(Continued)

FOREIGN PATENT DOCUMENTS

| CN | 203050572 U | 7/2013 |
| WO | WO 2007/096660 A1 | 8/2007 |

OTHER PUBLICATIONS

International Search Report and the Written Opinion of the International Searching Authority, or the Declaration, dated Aug. 1, 28014, PCT/US2013/069422, 16 pages, ISA/KR.

*Primary Examiner* — Christopher P Jones
*Assistant Examiner* — Minh-Chau Pham

(57) ABSTRACT

An apparatus and method for collection of particulate matter includes a plenum chamber formed in an funnel or a frustum configuration that discharges into a distribution chute assembly. The distribution chute assembly includes a number of individual chutes, each equipped with a circular collar or collar groove at the outlet which facilitates the attachment of the cylindrical dust collection sacks. The plenum chamber, distribution chute assembly, and individual dust collection sacks are carried by a frame assembly.

7 Claims, 7 Drawing Sheets

(51) Int. Cl.
    *B01D 50/00*     (2006.01)
    *B01D 46/02*     (2006.01)
    *E21B 41/00*     (2006.01)
    *B01D 46/00*     (2006.01)

(58) Field of Classification Search
    USPC .............. 55/385.1, 337, 343, 345, 356, 467,
                    55/DIG. 3; 95/273; 175/206; 198/529
    See application file for complete search history.

(56) References Cited

U.S. PATENT DOCUMENTS

| | | | | |
|---|---|---|---|---|
| 2,634,952 | A * | 4/1953 | Brinkley | E21B 21/01 |
| | | | | 175/206 |
| 2,721,725 | A * | 10/1955 | Biggs | B23Q 11/0053 |
| | | | | 175/206 |
| 3,811,518 | A * | 5/1974 | Kalaf | E21B 21/07 |
| | | | | 175/206 |
| 3,887,020 | A | 6/1975 | Chaffin | |
| 3,895,929 | A | 7/1975 | Jysky et al. | |
| 3,910,360 | A | 10/1975 | Sundstrom | |
| 4,223,748 | A * | 9/1980 | Barendsen | B07B 7/02 |
| | | | | 175/206 |
| 4,631,125 | A * | 12/1986 | Parks | B01F 13/10 |
| | | | | 198/560 |
| 5,358,121 | A * | 10/1994 | Robak | B07B 4/02 |
| | | | | 209/137 |
| 7,282,074 | B1 * | 10/2007 | Witter | B01D 45/12 |
| | | | | 451/453 |
| 7,373,996 | B1 * | 5/2008 | Martin | E21B 21/065 |
| | | | | 175/206 |
| 7,550,021 | B2 * | 6/2009 | Witter | B01D 45/12 |
| | | | | 55/295 |
| 8,393,050 | B2 | 3/2013 | Witter | |
| 2008/0277121 | A1 | 11/2008 | Phillippi et al. | |
| 2010/0320000 | A1 * | 12/2010 | Sormunen | B01D 46/0068 |
| | | | | 175/206 |

\* cited by examiner

MOBILE MULTI SACK DUST COLLECTION APPARATUS

The present application is a U.S. National Stage patent application of International Patent Application No. PCT/US2013/069422, filed on Nov. 11, 2013, the benefit of which is claimed and the disclosure of which is incorporated herein by reference in its entirety.

TECHNICAL FIELD

The present disclosure relates generally to oilfield equipment and in particular to the capture and transportation of dust discharged into the atmosphere during the use of sand in a hydraulic fracturing operation.

BACKGROUND

Gas and oil well stimulation requires large volumes of raw sand that are used to hold or "prop" open fractures during hydraulic fracturing, allowing hydrocarbons to flow freely through the open fractures back to the surface. The current equipment and practices used to load, unload, and blend sand during well stimulation allow high concentrations of dust from the sand to vent into the atmosphere and become airborne over long periods of time. This dust may lead to premature wear and may even cause failure of high value capital equipment. For example, clogged air filters and dust packed radiator cores are common causes of engine failure in well stimulation equipment. Additionally, the dust from the raw sand is highly abrasive and may cause premature wear on cylinders, bearings, gear sets, shafts, and other moving parts.

More importantly, such airborne dust may be harmful to exposed operators and third parties. To mitigate the damaging effects of dust in hydraulic fracturing operations, some operators now employ a vacuum system to capture the airborne dust and discharge it into fifty-five gallon barrels or drums.

Positioning and connecting empty fifty-five gallon barrels to the vacuum system can be challenging for the operator, but these challenges are exacerbated when sand-filled barrels need to be moved and emptied. Transporting and emptying a dust-filled fifty-five gallon barrel requires a significant amount of operator effort and the use of heavy machinery. Indeed a dust-filled fifty-five gallon barrel weights about 750 to 800 pounds. The large volume of dust collected via the dust collection system and the concomitant sheer number of barrels that need to be shifted during well stimulation operations can create material handling difficulties.

BRIEF DESCRIPTION OF THE DRAWINGS

Embodiments are described in detail hereinafter with reference to the accompanying figures, in which.

DETAILED DESCRIPTION

Figure 1:
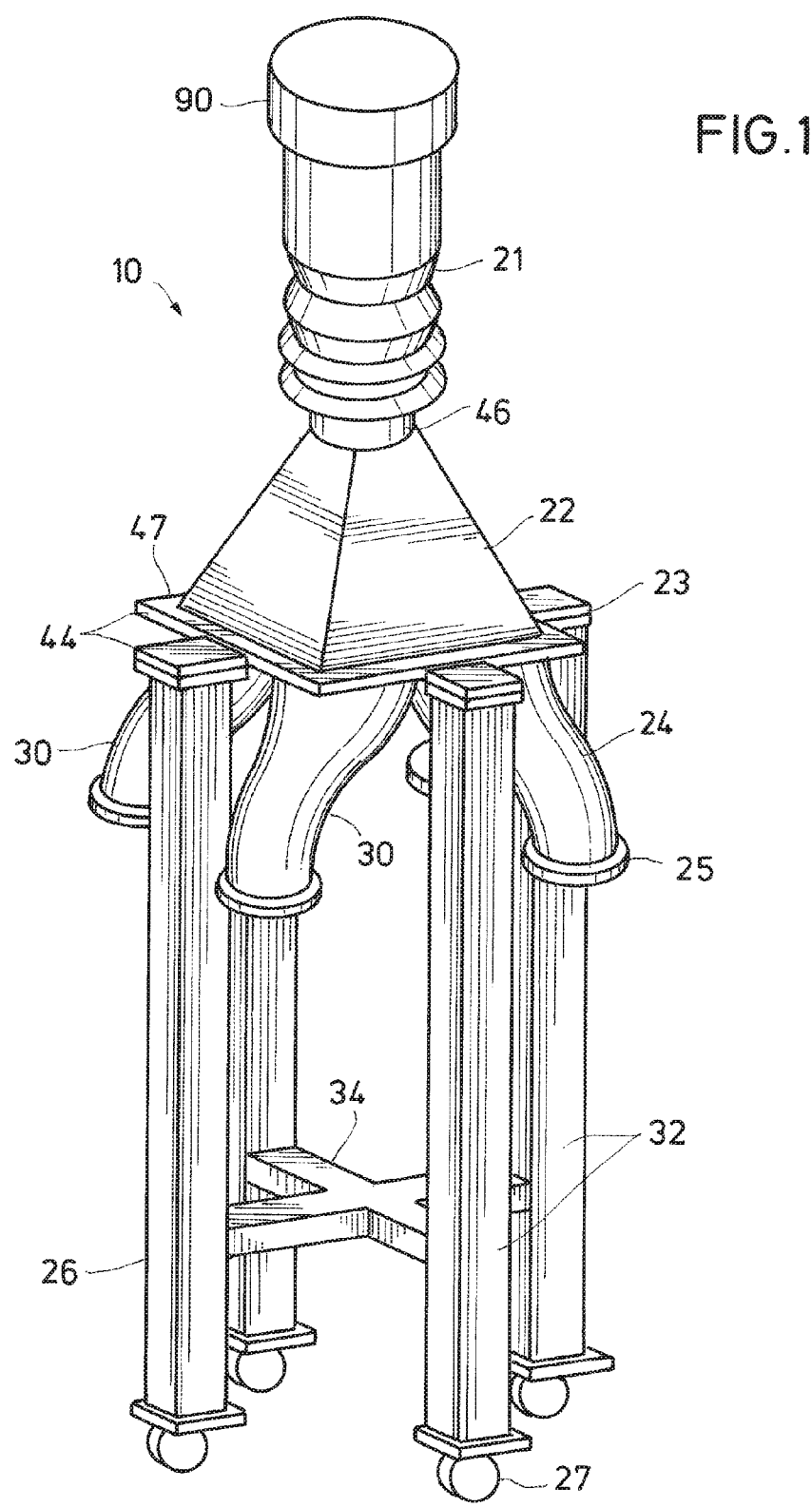
FIG. 1 is a perspective view of a mobile multi-sack dust collection apparatus according to a first embodiment, showing the main components of the apparatus, including the plenum chamber, distribution chute assembly, and support structure.
Figure 2:
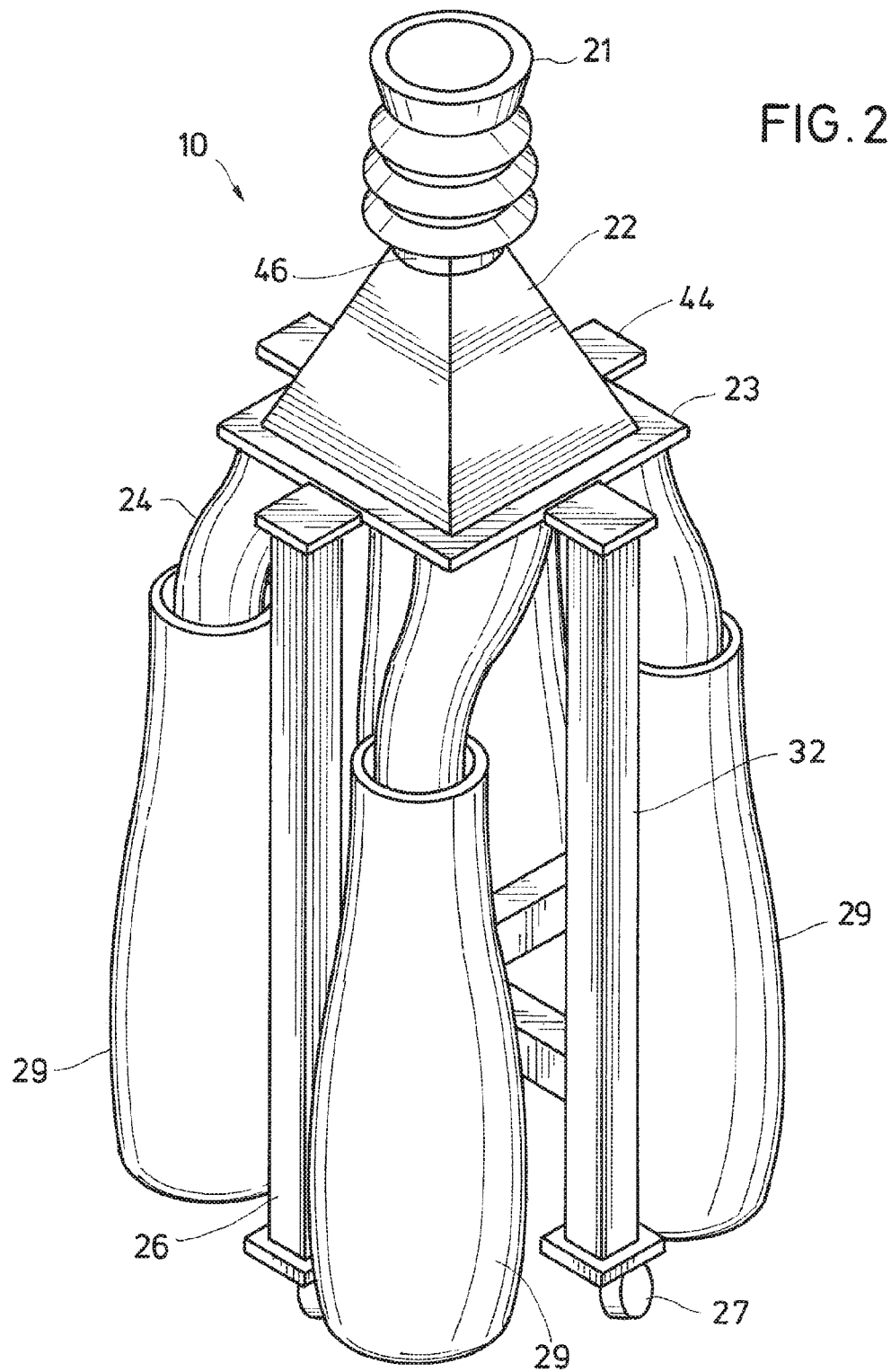
FIG. 2 is a perspective view of the mobile multi-sack dust collection apparatus of FIG. 1, showing the main components of the apparatus together with installed dust collection sacks.

FIGS. 1-4 illustrate a mobile multi-sack dust collection apparatus 10 according to a first embodiment. The main components of the apparatus include a plenum chamber 22, a distribution chute assembly 24, a support structure 26, and dust collection bags or sacks 29.

Figure 3:
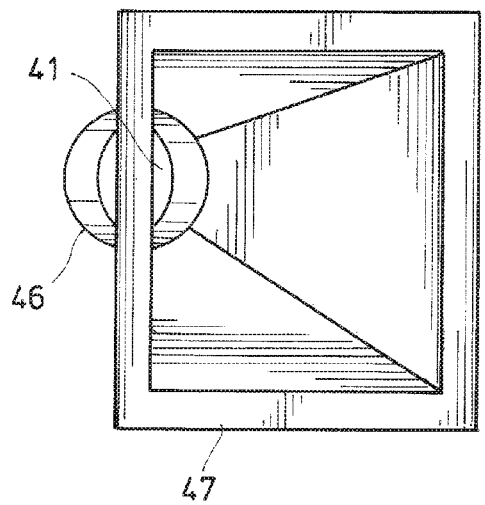
FIG. 3 is a bottom perspective view of the plenum chamber of the dust collection apparatus of FIG. 1.
Figure 4:
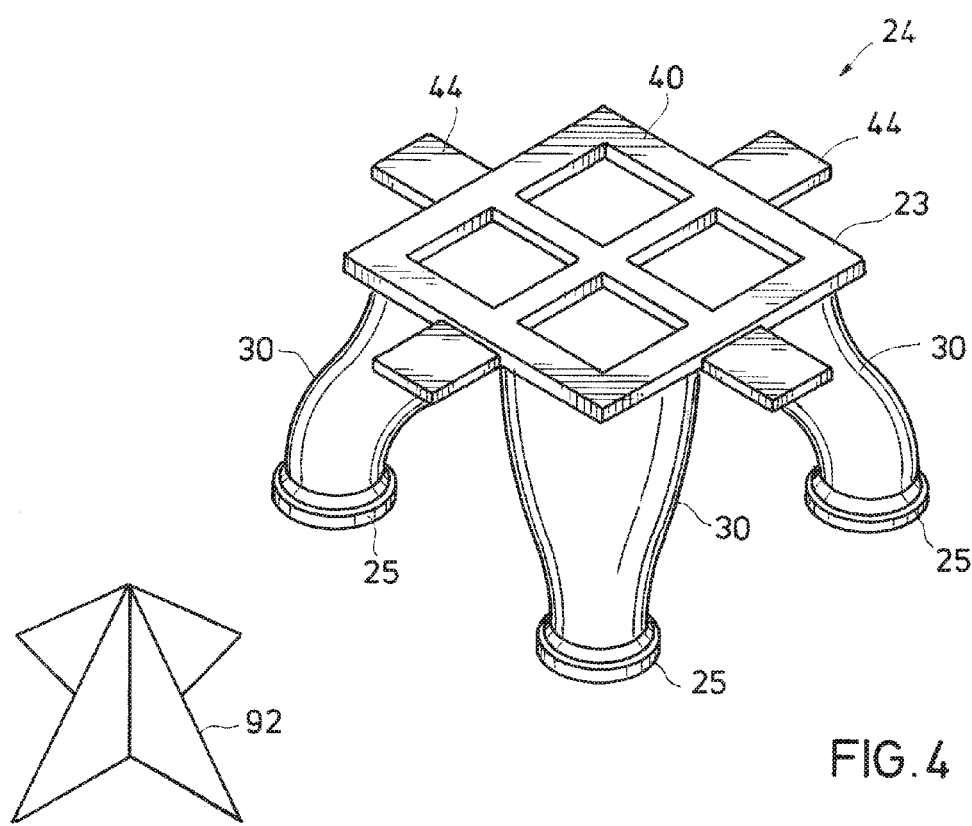
FIG. 4 is a perspective view of the distribution chute assembly of the apparatus of FIG. 1, showing four chutes connected together at their upper ends by a connector plate and having discrete collars at their lower ends for the securement of dust collection sacks.
Figure 5:
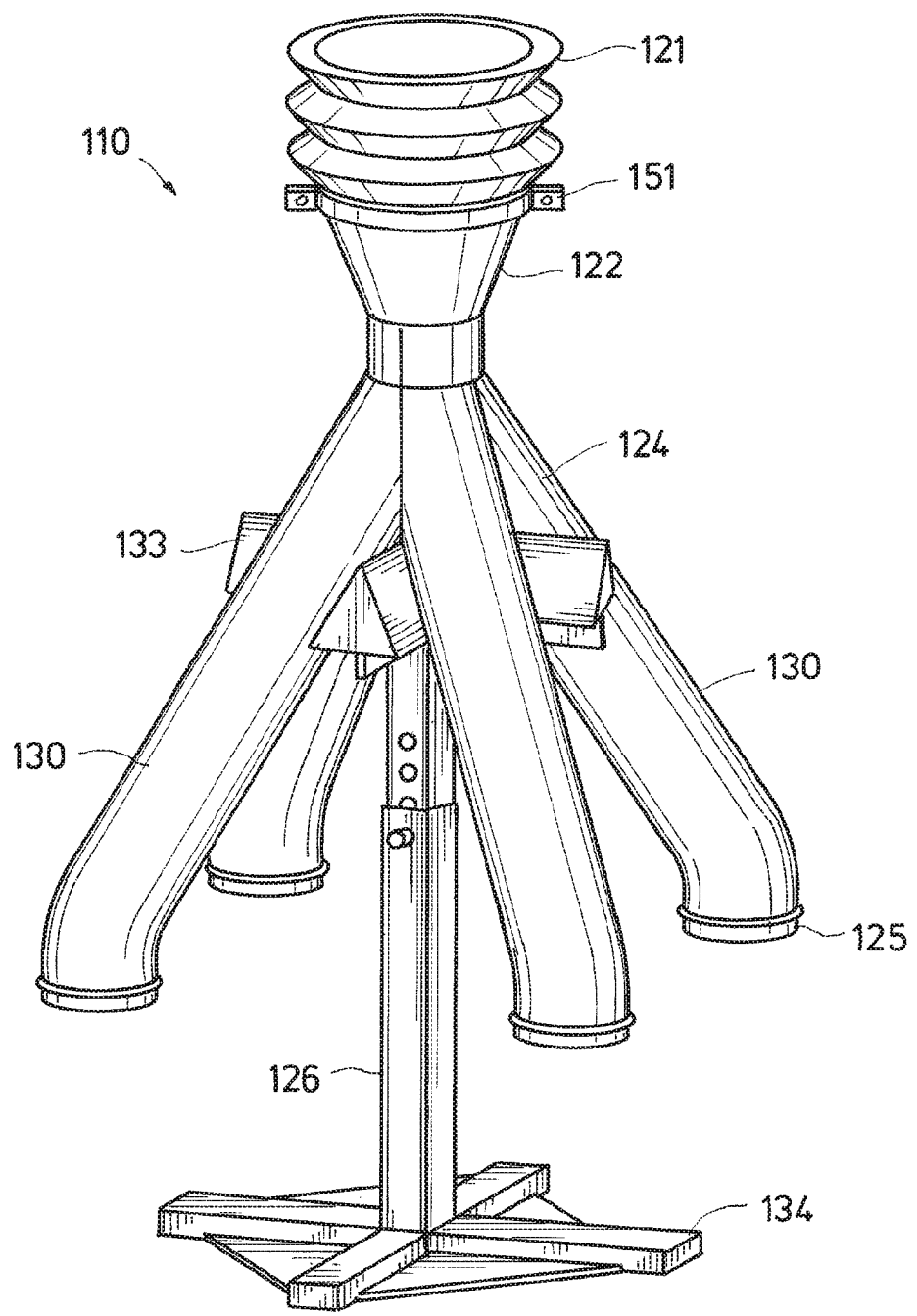
FIG. 5 is a perspective view of a multi-sack dust collection apparatus according to a second embodiment, showing the main components of the apparatus, including the plenum chamber, a quadra-tubing distribution chute assembly, and stand.
Figure 6:
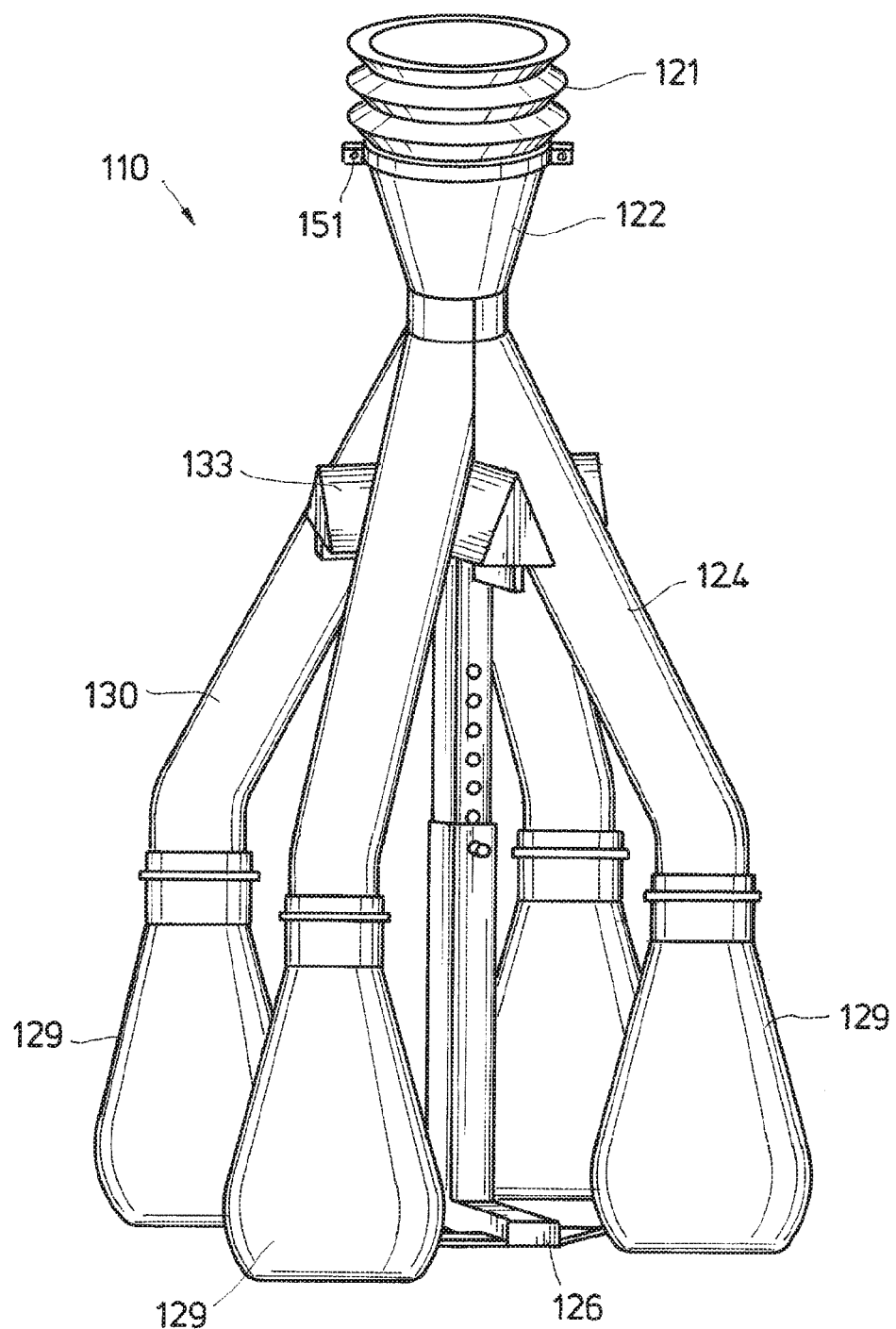
FIG. 6 is a perspective view of the multi-sack dust collection apparatus of FIG. 5, showing the main components of the apparatus together with installed dust collection sacks.

A sleeve 46 is located at the apex of plenum chamber 22 and defines an inlet 41 (FIG. 3). A duct 21 may be connected to sleeve 46. Duct 21 may be a flexible hose or rigid pipe, for example. Duct 21 supplies collected particulate matter to the collection apparatus 10 as is known in the art of dust collection systems.

Plenum chamber 22 is preferably frustoconical-, pyramid- or cone-shaped, and it has a lower flange 47 that is connected to the top of and carried by a connector plate 23 of the distribution chute assembly 24. Plenum chamber 22 receives the particulate matter via duct 21 and inlet 41 from an apparatus 90 (shown functionally), such as a dust vacuum system, and it serves to more or less evenly distribute the particulate matter to thereby promote even loading of the dust collection sacks 29.

The distribution chute assembly 24 includes connector plate 23, which includes multiple openings formed therethrough, each defining an outlet 40. The combined cross-sectional area of outlets 40 preferably exceeds the cross-sectional area of inlet 41. Connector plate 23 also serves as the attachment point for the upper ends of multiple individual chutes 30, one for each individual outlet 40. Although four outlets 40 and four chutes 30 are illustrated, a greater or lesser number of outlets and chutes may be provided as appropriate.

The lower end of each chute 30 ideally includes a collar 25, which facilitates the connection of collection bags 29 to the chutes 30. Bags 29 may be removably attached to chutes by cinching a draw string or clamping the bag about the chute just above collar 25, for example. In certain embodiments, bags 29 may be suspended from their respective chutes 30 a distance above the ground to permit easy manipulation and/or loading of fall bags into a conveyance apparatus, such as a vehicle or conveyor.

A support structure 26, such as a stand, is used to support the apparatus structurally. Stand 26 may include one or more legs 32 and reinforcing cross members 34. Legs may be of a predetermined fixed length or adjustable in length to accommodate different bag sizes and facilitate bag manipulation and handling. Connector plate 23 is supported by stand 26. In certain embodiments, plate 23 includes tabs 44 that are dimensioned to be carried atop legs 32. Chutes 30 and bags 29 are ideally intervaled between legs 32. Stand 26 may be provided with wheels 27 for mobility to various working sites. The legs of the stand 26 may be used to support the dust collection sacks 29 so that they remain vertical even after filling up.

In operation, particulate matter discharged from the vacuum hopper passes through duct 21 and flows to the plenum chamber 22 via inlet 41. The particulate matter is distributed into the four outlets 40, flows through chutes 30 into dust collection sacks 29. In some embodiments, one or more distributions vanes 92 may be disposed within plenum chamber 22 to enhance even distribution of particulate matter. For example vanes 92 may be attached to plate 23 and extend up into plenum chamber 22 or vanes 92 may be attached to the interior walls of plenum chamber 22. Multiple dust collection sacks 29 are used to collect the dust discharged from the chutes 30. The dust collection sacks 29 which are secured to the chutes 30 through the collars 25 can be removed to desired locations. Because dust collection sacks 29 are flexible, the amount of dust collected versus the remaining volume is easily discerned by the operator, which allows the operator to replace the bags before they become overfilled.

The above-recited components are manufactured and assembled to create dust collector apparatus 10, which facilitates a simpler and more easily transported alternative to capturing airborne dust released from sand during hydraulic fracturing operations than systems of prior art. The components may be cast, molded, machined, welded, or otherwise formed from rigid and flexible materials according to conventional manufacturing techniques. Such manufacturing techniques are well known, accordingly further details are not provided herein.

FIGS. 5-8 illustrate a mobile multi-sack quadra-tubing dust collection apparatus 110 according to other embodiments. The main components of the apparatus include a plenum chamber 122, a quadra-tubing distribution chute assembly 124, a support structure 126, and dust collection bags or sacks 129.

An opening located at the apex of plenum chamber 122 defines an inlet to which a duct 121 may be connected, such as by a spring T-bolt clamp 151 or the like. Duct 121 may be a flexible hose or rigid pipe, for example. Duct 121 supplies collected particulate matter to the collection apparatus 110 as is known in the art of dust collection systems.

Plenum chamber 122 is preferably funnel-shaped, and it is connected to the top of and carried by a quadra-tubing distribution chute assembly 124. Plenum chamber 122 receives the particulate matter via duct 121 from an apparatus 90 (shown functionally), such as a dust vacuum system, and serves to more or less evenly distribute among sacks 129 the particulate matter to thereby promote even loading of the multiple dust collection sacks 129. The upper and lower ends of plenum chamber 122 define inlet and outlet cross sectional areas, respectively, and due to the funnel shape of plenum chamber 122, the outlet cross sectional area is less than the inlet cross sectional area.

The quadra-tubing distribution chute assembly 124 includes multiple tube segments, or chutes 130. Although four chutes 130 are illustrated, a greater or lesser number of chutes may be provided as appropriate. In a preferred embodiment, chutes 130 have a bend of approximately 15-60 degrees, with an optimum angle of approximately 30 degrees, with respect to vertical, which promotes a smooth flow of dust with no settlement. The lower end of each chute 130 ideally includes a collar or collar groove 125, which facilitates the connection of collection bags 129 to the chutes 130. Bags 129 may be removably attached to chutes 130 by cinching a draw string or clamping the bag about the chute 130 just above collar or collar groove 125, for example.

Figure 7:
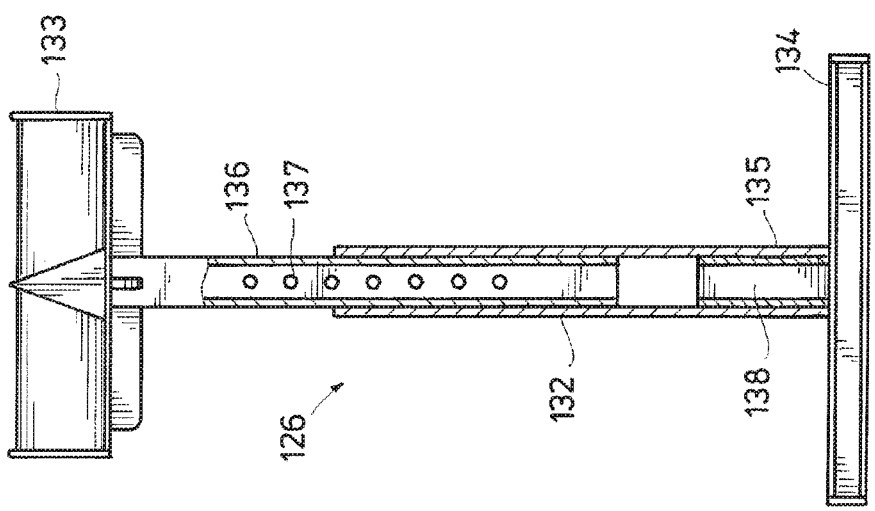
FIG. 7 is an elevation view in partial cross section of the support structure of FIG. 5; showing a cruciform cradle carried atop a telescopic leg.

A portable support structure 126, such as a stand, is used to support the apparatus 110 structurally. Stand 126 includes a base 134, atop which a vertical leg 132 is mounted, terminating in a saddle or cradle 133 that is dimensioned to carry quadra-tubing distribution chute assembly 124. For the embodiment illustrated, in which the distribution chute assembly 124 has four chutes 130, cradle 133 has a wedge-shaped cross-members in a cruciform connection that fits between chutes 130 to support distribution chute assembly 124. Leg 132 may be telescopic, formed of a lower fixed member 135 and an upper movable member 136. As shown in FIG. 7 leg 132 may include slots to accommodate a locking pin, and a stopper 138 may be located within lower leg member 135 to prevent upper member 136 from lowering too far. The stopper is a safety feature that prevents an operator's hands from becoming pinched should the upper member inadvertently slip downward within the lower member.

Figure 8:
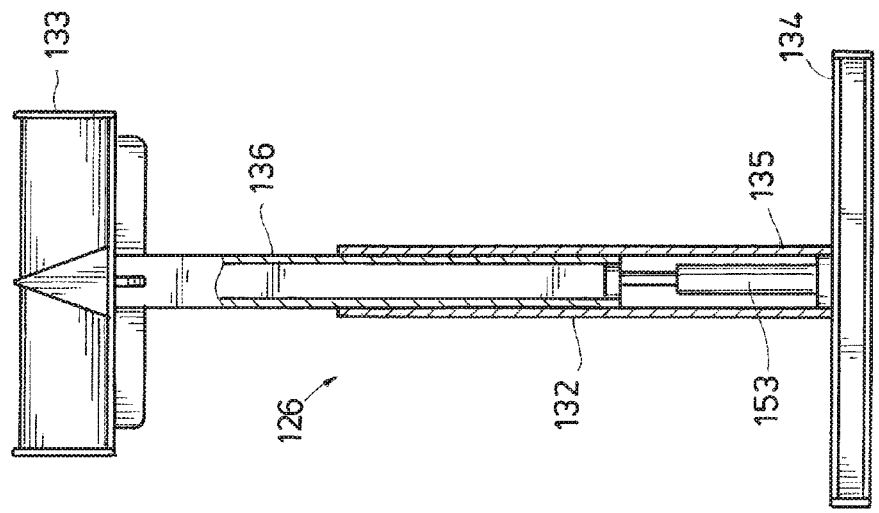
FIG. 8 is an elevation view in partial cross section of the support structure of FIG. 5 according to another embodiment; showing a telescopic leg and a actuator for selectively raising and lowering the dust collection apparatus.

As shown in FIG. 8, in certain embodiments, support structure 126 may be vertically adjustable and movable by an actuation device 153, such as an electric, hydraulic, or pneumatic motor or linear actuator as known in the art, to facilitate manipulation of bags. For example, support structure 126 may be lowered to allow easy attachment of bags 129. Then support structure 126 may be raised to facilitate filling of bags 129. In this regard as bags 129 fill, support structure 126 may rise at intervals to accommodate bags 129 during filling. Finally once bags 129 are filled as desired, support structure 126 may be actuated to raise the bags 129 a sufficient distance above the ground that a transport or conveyance system may be readily disposed under the bags. Further actuation of support structure 126 lowers the bags on to the transport or conveyance system to facilitate detachment and removal of bags 129. Flexible duct 121 allows for such vertical movement.

In operation, particulate matter discharged from the vacuum hopper passes through duct 121 and flows to the plenum chamber 122. The particulate matter is distributed via the four chutes 130 into dust collection sacks 129. Multiple dust collection sacks 129 are used to collect the dust discharged from the chutes 130. The dust collection sacks 129, which are secured to the chutes 130 using the collars or collar grooves 125, can be removed and emptied or transported to desired locations. Because dust collection sacks 129 are flexible, the amount of dust collected versus the remaining volume is easily discerned by the operator, which allows the operator to replace the bags before they become overfilled.

The above-recited components are manufactured and assembled to create dust collector apparatus 110, which facilitates a simpler and more easily transported alternative to capturing airborne dust released from sand during hydraulic fracturing operations than systems of prior art. The components may be cast, molded, machined, welded, or otherwise formed from rigid and flexible materials according to conventional manufacturing techniques. Such manufacturing techniques are well known, accordingly further details are not provided herein.

Figure 9:
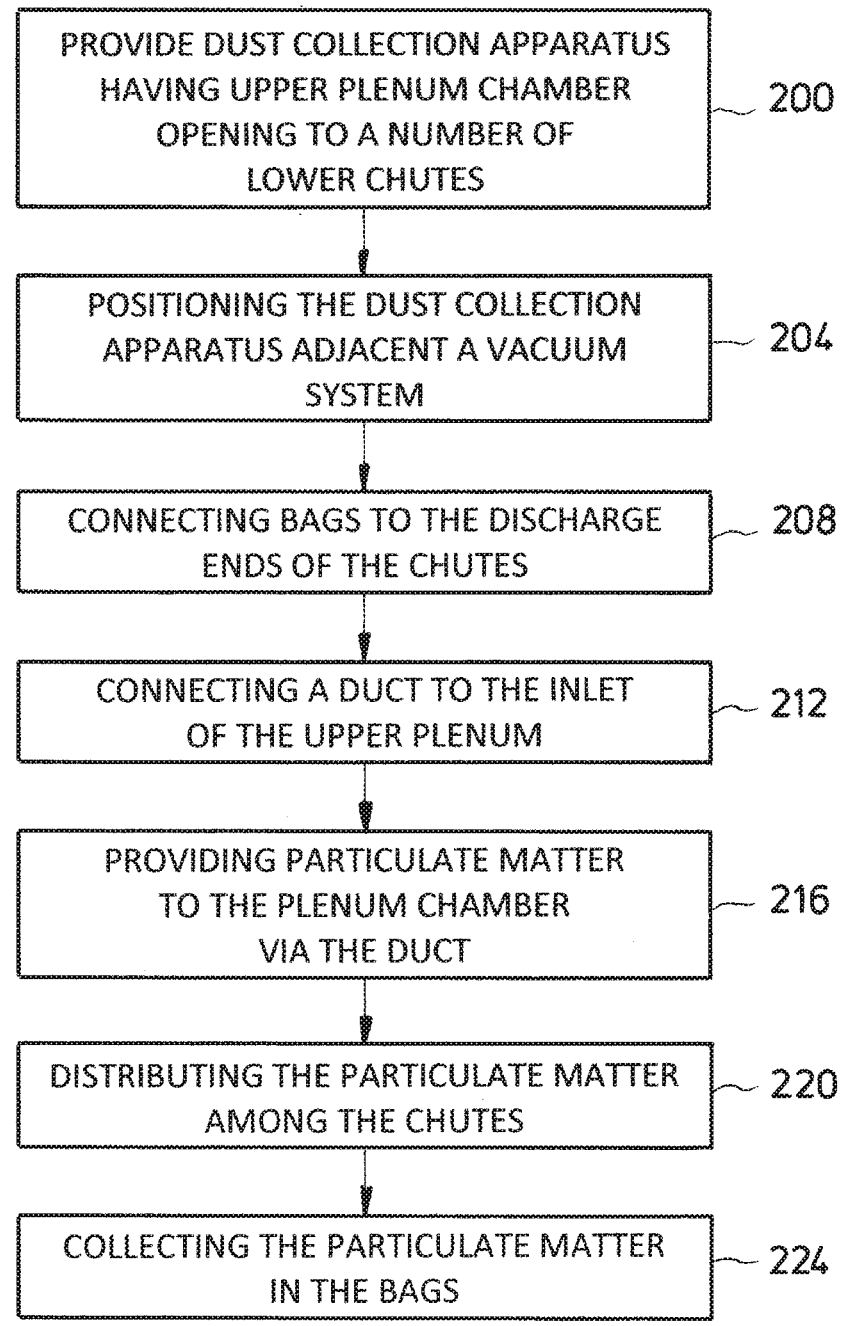
FIG. 9 is a flow chart illustrating a method of collecting dust according to a preferred embodiment.

FIG. 9 is a flow chart that illustrates a method of collecting dust according to a preferred embodiment. Referring to FIG. 9, as well as FIGS. 2 and 6, at step 200, a dust collection apparatus having upper plenum chamber 22, 122 that dispenses to a number lower chutes 30, 130 is provided. At step 204, the dust collection apparatus is positioned adjacent a vacuum system. Preferably the dust collection apparatus is portable to facilitate movement as desired. In certain embodiments, it may be transported with the vacuum system. Bags 29, 129 are attached at step 208 to the discharge ends of the chutes 30, 130, using clamps, straps, or the like, with collars, or collar grooves 25, 125 facilitating a secure connection. Duct 21, 121 is connected at step 212 to the inlet of the plenum chamber. Having been thus assembled, dust is then transferred to the dust collection apparatus 10, 110 via duct 21, 121, and is distributed and transferred into bags 29, 129 via the chutes 30,130 in steps 216, 220, and 224, respectively.

Bags 29, 129 may be formed of any suitable fabric or material, including polymeric, elastomeric, natural fiber, or cellulose materials and the like. While various embodiments have been described in the context of bags or sacks 29, 129, other types of flexible, semi-rigid, or rigid containers may also be used as appropriate.

The system may be deployed adjacent a hydrocarbon well site where fracturing operations are taking place. Airborne dust from fracturing proppant is removed from the air using a vacuum system. The dust is conveyed from the vacuum system to the dust collection apparatus 10, 110 of the disclosure.

Thus, a multi-sack dust collection apparatus has been described. Embodiments of the multi-sack dust collection apparatus may generally have a plenum chamber defining upper and lower ends, the upper end of said plenum chamber including an inlet dimensioned for connection to a duct, first, second, and third chutes defining upper and lower ends, the upper ends of the first, second, and third chutes being fluidly coupled to the lower end of said plenum chamber, and first, second, and third bags removably carried by the lower ends of the first, second, and third chutes, respectively.

The multi-sack dust collection apparatus may also include any one of the following elements, alone or in combination with each other: A fourth chute defining upper and lower ends, the upper end of said fourth chute being fluidly coupled to said lower end of the plenum chamber, and a fourth bag removably carried by the lower end of said fourth chute; first, second, and third outlets included in the lower end of the plenum chamber, the first, second, and third chutes being fluidly coupled to said first, second, and third outlets, respectively; a fourth outlet located in the lower end of the plenum chamber, a fourth chute defining upper and lower ends, the upper end of the fourth chute being fluidly coupled to the fourth outlet, and a fourth bag removably carried by the lower end of the fourth chute; a support structure carrying the plenum chamber; a plurality of wheels carrying the support structure; a telescopic leg included in the support structure; a tubular lower member, an upper member, and a stopper all included in the telescopic leg, the upper member being slideably received in the lower member, and the stopper being disposed in the lower member below said upper member, whereby the stopper limits the downward travel of the upper member with respect to the lower member; an actuator operatively coupled to the telescopic leg so as to selectively raise and lower the plenum chamber; first, second, and third collars or collar grooves formed on the lower ends of the first, second, and third chutes, respectively, whereby the first, second, and third bags are suspended by the first, second, and third collars; and a vacuum system fluidly coupled to the plenum chamber.

The multi-sack dust collection apparatus may also be characterized by any one of the following characteristics, alone or in combination with each other: At least a portion of the plenum chamber has a shape of a frustum; at least a portion of said plenum chamber has a shape of a funnel; the upper end of the plenum chamber defines an inlet cross-sectional area, the lower end of the plenum chamber defines an outlet cross-sectional area, and the inlet cross-sectional area is less than said outlet cross-sectional area, or the inlet cross-sectional area is greater than said outlet cross-sectional area; and a combined volume of the first, second, third, and fourth bags is approximately equal to 55 gallons.

The Abstract of the disclosure is solely for providing the United States Patent and Trademark Office and the public at large with a way by which to determine quickly from a cursory reading the nature and gist of technical disclosure, and it represents solely one or more embodiments.

While various embodiments have been illustrated in detail, the disclosure is not limited to the embodiments shown. Modifications and adaptations of the above embodiments may occur to those skilled in the art. Such modifications and adaptations are in the spirit and scope of the disclosure.

What is claimed:

1. A method for the collection of particulate matter, comprising:
    providing a dust collection apparatus having a plenum chamber with an upper inlet and a lower end fluidly connected to first, second, and third chutes disposed at an angle of about 15-60 degrees with respect to vertical, respectively;
    connecting first, second, and third bags to lower ends of said first, second, and third chutes, respectively;
    connecting a duct to said inlet;
    conducting fracturing operations at a hydrocarbon well site;
    collecting airborne proppant dust at said well site from said fracturing operations;
    providing said collected airborne proppant dust to said dust collection apparatus via said duct; and
    flowing the proppant dust from the plenum chamber through the first, second and third chutes into the first, second and third bags through the first, second and third chutes.

2. The method of claim 1 further comprising:
    distributing said proppant dust into said first, second, and third bags by said plenum chamber.

3. The method of claim 1 further comprising:
    carrying said dust collection apparatus atop a frame.

4. The method of claim 3 further comprising:
    carrying said frame atop a plurality of wheels; and
    rolling said dust collection apparatus from a first location to a second location.

5. The method of claim 1 further comprising:
    removably attaching said first, second, and third bags to said first, second, and third chutes, respectively.

6. The method of claim 1 further comprising:
    providing a fourth chute that is fluidly connected to said lower end of said plenum chamber; and
    connecting a fourth bag to said fourth chute.

7. The method of claim 1 further comprising:
    lowering said first, second, and third chutes to facilitate attachment of said first, second, and third bags;

raising said first, second, and third chutes as said first, second, and third bags become filled with said proppant dust; and raising said first, second, and third chutes to facilitate removal of said first, second, and third bags.

\* \* \* \* \*